(12) United States Patent
Villaume et al.

(10) Patent No.: US 7,835,829 B2
(45) Date of Patent: Nov. 16, 2010

(54) AUTOMATIC TAKE-OFF METHOD AND DEVICE FOR AN AIRPLANE

(75) Inventors: Fabrice Villaume, Toulouse (FR); Christophe Jourdan, Toulouse (FR); Armand Jacob, Pibrac (FR); Vincent Blondin, Toulouse (FR)

(73) Assignees: Airbus France, Toulouse (FR); Airbus, Blagnac (FR)

( * ) Notice: Subject to any disclaimer, the term of this patent is extended or adjusted under 35 U.S.C. 154(b) by 316 days.

(21) Appl. No.: 11/949,508

(22) Filed: Dec. 3, 2007

(65) Prior Publication Data
US 2008/0135688 A1 Jun. 12, 2008

(30) Foreign Application Priority Data
Dec. 5, 2006 (FR) .................................. 06 10596

(51) Int. Cl.
*G06G 7/70* (2006.01)
(52) U.S. Cl. .......................... 701/15; 244/183
(58) Field of Classification Search ..................... 701/3, 701/15; 244/75.1, 76 R, 181–183, 190
See application file for complete search history.

(56) References Cited

U.S. PATENT DOCUMENTS

| | | | | |
|---|---|---|---|---|
| 3,752,967 A | * | 8/1973 | Vietor | 701/15 |
| 3,945,590 A | * | 3/1976 | Kennedy et al. | 244/181 |
| 4,042,197 A | * | 8/1977 | Boyle et al. | 244/183 |
| 4,980,833 A | * | 12/1990 | Milligan et al. | 701/15 |
| 5,016,177 A | * | 5/1991 | Lambregts | 701/14 |
| 5,142,478 A | * | 8/1992 | Crook | 701/16 |
| 7,195,200 B2 | * | 3/2007 | Yamane | 244/76 R |
| 2005/0230564 A1 | * | 10/2005 | Yamane | 244/183 |
| 2006/0214063 A1 | * | 9/2006 | Firuz et al. | 244/175 |
| 2007/0246605 A1 | * | 10/2007 | Lavergne et al. | 244/76 R |
| 2008/0135688 A1 | * | 6/2008 | Villaume et al. | 244/181 |
| 2009/0171518 A1 | * | 7/2009 | Yamane | 701/15 |

FOREIGN PATENT DOCUMENTS

EP 1586969 10/2005
FR 2874204 2/2006

OTHER PUBLICATIONS

European Search Report dated August 21, 2007.

* cited by examiner

*Primary Examiner*—Jack W Keith
*Assistant Examiner*—Rami Khatib
(74) *Attorney, Agent, or Firm*—Dickinson Wright PLLC

(57) ABSTRACT

Automatic take-off method and device for an airplane. The device includes a device for automatically determining, using an elevation guidance objective, a vertical piloting objective which is expressed as rate of pitch, and a device for automatically determining, using the vertical piloting objective, deflection commands for elevators of the airplane.

26 Claims, 4 Drawing Sheets

AUTOMATIC TAKE-OFF METHOD AND DEVICE FOR AN AIRPLANE

TECHNICAL FIELD OF THE INVENTION

The present invention relates to an automatic take-off method and device for an airplane, in particular a transport airplane.

BACKGROUND OF THE INVENTION

It is known that, since the start of civil aviation, the take-off of an airplane is handled manually by the airplane's pilot by means of piloting units (central control column or side-stick controller, rudder bar) that are specific to the airplane concerned. During this take-off phase, the crew is responsible for controlling the path of the airplane, both in the vertical plane and in the lateral plane (or horizontal plane). The crew has to follow theoretical guidance objectives (recommendation of the airplane's flight manual), visual guidance objectives (axis of the runway) and/or physical guidance objectives (for example, reference of an LOC-type antenna, specified below).

In such a standard manual take-off, there arises the problem of the quality with which the guidance objectives are followed during the take-off.

If we look firstly at the elevation guidance (that is, in the vertical plane), the fact that the crew is responsible for the take-off renders the quality of the rotation directly dependent on the behavior of the pilot.

Assessing the rotation speed, the speed at which the pilot must pull on the control column (central control column or side-stick controller) to initiate the rotation of the airplane, is done visually.

Because of this, a greater or lesser time delay may occur between the moment when the pilot realizes that he has reached the rotation speed and the moment when he pulls on the control column.

At this instant in the take-off, the airplane is at high speed, and this time delay is reflected in a dispersion over the take-off distance.

In the opposite case, it may be that the pilot pulls too early on the control column. In this case, the speed of the airplane does not allow it to take off, and the airplane continues to accelerate with the nose lifted. This is reflected in a very significant drag, and also, a direct impact on the take-off distance.

Furthermore, with large airplanes, a risk of tailstrike on take-off must be taken into account. It is, in fact, not rare to observe this type of incident in service, which normally results in a lengthy lay-up of the airplane. Such an incident is normally the result of a nonconforming action on the part of the pilot (excessive pull-up command) or an unforeseen external phenomenon (violent gust of wind, for example).

If we now consider, generally, the lateral guidance of the airplane, there is today just one source of help in the lateral guidance, namely a lateral alignment beam of LOC type which is emitted from the ground and which is detected on the airplane using a detection system. Such a lateral alignment beam or LOC beam is normally emitted by a directional VHF radiotransmitter, which is placed on the axis of the runway, at the end opposite from the threshold. This LOC beam is intended for landing and, in principle, ensures azimuth guidance along the approach axis, and this according to an ideal lateral alignment profile in a precision instrument approach of the ILS (Instrument Landing System) type. This radiotransmitter normally emits two signals with different modulation which overlap in the approach axis where the two-signals are received with equal intensity. Although this LOC beam can also be used for the take-off, it was created, and is characteristics have therefore been more particularly adapted, for use on a landing.

If a sight guidance mode (as mentioned above) remains acceptable in clear weather, it becomes very difficult in reduced visibility conditions. Similarly, the workload of the pilot greatly increases if an engine fails. The pilot must then trim the thrust difference while ensuring a good rotation.

Thus, the performance levels of the airplane on take-off directly depend on the behavior and the feelings of the pilot (stress, fatigue). This phenomenon is amplified when the weather conditions worsen. The wind is in particular the most disturbing factor in this phase.

SUMMARY OF THE INVENTION

The object of the present invention is to remedy these drawbacks. It relates to an automatic take-off method for an airplane, which makes it possible to at least partly automate the take-off phase by proposing an automatic elevation guidance mode to ensure automatic rotation.

To this end, according to the invention, said method is noteworthy in that, for an elevation guidance of the airplane on a take-off, the following successive series A of steps is performed, automatically and repetitively, on said take-off:

A. a) an elevation guidance objective is determined which represents an angular profile along the pitch axis of the airplane and which makes it possible to obtain optimized performance levels according to take-off conditions (weight of the airplane, engine failure, wind, etc.), said angular profile being expressed according to a first parameter;

A. b) the current value of said first, parameter is measured on the airplane;

A. c) from said elevation guidance objective and said measured current value of said first parameter, a vertical piloting objective is determined which is expressed as rate of pitch;

A. d) from said vertical piloting objective, elevator deflection commands are determined for the airplane; and A. e) the duly determined deflection commands are applied to operators of said elevators.

Thus, thanks to the invention, it is possible to ensure that a predefined vertical path objective is followed. This objective is defined to obtain the best performance of the airplane regardless of the take-off conditions (weight of the airplane, engine failure, wind, etc.), and this, as specified below, by also guaranteeing safety with regard to a tailstrike.

The method according to the invention also makes it possible to ensure almost identical take-off performance levels, whatever the physical, meteorological and human conditions, and to make these performance levels repetitive for a given airplane. This is a way of remedying the abovementioned drawbacks that exist for standard manual take-offs.

It will be noted that the performance levels on take-off can be enhanced by the use of an optimal elevation guidance profile, in order to reduce the take-off distance. Reducing the take-off distance can then be translated, for a given airplane, into:

the possibility of increasing the weight of fuel, which makes it possible to increase the action radius of the airplane, and so, for example, reach airports that were hitherto inaccessible;

the possibility of increasing the payload, which makes it possible to transport more passengers for commercial flights or more cargo; and the possibility of taking off on airports with shorter runways.

In a preferred embodiment, in the step A.c), said vertical piloting objective QcPA is determined from the following expression:

$$QcPA = k1 \cdot (\theta c - \theta eff)$$

in which:
  k1 is a predetermined gain;
  θc represents said angular profile. Preferably, said angular profile is expressed as a trim value (or, possibly, as an angle of climb value); and
  θeff represents a measured current value of the trim of the airplane (or, possibly, of the angle of climb of the airplane).

The present invention therefore makes it possible to obtain an automatic guidance of the airplane in the vertical plane on the take-off. The guidance objective is therefore an angular profile along the pitch axis of the airplane (expressed as an angle of climb or, preferably, as a trim), which is defined to ensure the best performance levels given the airplane concerned, the airport and the external conditions (wind, etc.).

Advantageously, the value of said angular profile is limited relative to the capabilities of the airplane in order to avoid a tailstrike on the take-off.

Furthermore, in a particular embodiment (of automatic type):
  on the take-off, at least one adjustable horizontal stabilizer of the airplane, on which are articulated said elevators, is brought to a fixed position which depends on the aircraft balance of the airplane; and/or
  the current speed of the airplane is measured, it is compared to a predetermined rotation speed, and the automatic guidance and at least the abovementioned step A. e) are applied, only when said current speed becomes greater than said rotation speed.

Moreover, in a preferred embodiment, when the airplane is moving (running) on the take-off, the bank angle is controlled automatically, so as to keep its wings flat, in order to automatically keep the bank angle close to zero during the rotation of the airplane, in order in particular to avoid a tailstrike, and for performance reasons. This control is implemented by exclusively controlling ailerons of said airplane.

Thus, simultaneously with the automatic trim (or angle of climb) management of the airplane in the take-off phase, the bank angle is automatically managed so that this maneuver is carried out with the wings flat. This is done by controlling only the deflection of the ailerons, without, for example, using the spoilers to avoid degrading the performance levels on the take-off.

Moreover, in a particular embodiment, a characteristic sign illustrating said elevation guidance objective is displayed automatically on at least one display screen, and in particular:
  a horizontal bar indicating the elevation guidance objective, for example on a primary piloting screen (through a flight director); and
  an indication of the automatic piloting mode currently engaged on a piloting mode indicator, for example a flight mode annunciator of a primary piloting screen.

Of course, in the context of the present invention, the crew, and in particular the pilot of the airplane, has the option to revert at any time to standard manual piloting in the vertical plane on the take-off, and this by retaking the controls of the airplane or by deactivating an automatic pilot that is activated and used for the automatic take-off in the vertical plane.

In a first embodiment, for the lateral guidance on the take-off, the airplane is guided manually by a pilot of the airplane using a standard rudder bar.

This first embodiment therefore corresponds to a semi-automatic take-off, since only the guidance of the airplane in the vertical plane is handled automatically in the manner specified above (through an automatic piloting means), the guidance of the lateral plane being handled manually.

Furthermore, in a second preferred embodiment, a lateral guidance of the airplane is performed automatically on the take-off. For this, according to the invention, the following successive series of steps B is performed, automatically and repetitively, on said take-off:
  B. a) a lateral guidance objective is determined which represents a particular guidance reference and which is expressed according to at least one second parameter;
  B. b) the current value of said second parameter is measured on the airplane;
  B. c) from said lateral guidance objective and said measured current value of said second parameter, a lateral piloting objective is determined which is expressed as rate of yaw;
  B. d) from said lateral piloting objective, actuation commands are determined to control elements acting on the yaw of the airplane; and
  B. e) said duly determined actuation commands are applied to operators of said elements.

Thus, in this second embodiment, the take-off phase is performed fully automatically, that is, both in the vertical plane and in the lateral plane. Preferably, said actuation commands are applied to actuation means both of a rudder and a nose wheel of the airplane.

The abovementioned series of steps B therefore concerns an automatic lateral guidance mode. This automatic guidance mode can be implemented in a number of variants, according to the lateral guidance objective (or guidance reference) used, as specified below.

Advantageously, said guidance reference concerns a second parameter which is defined for the runway used by the airplane for the take-off, namely the track and/or the heading of the runway.

In a first embodiment, in the step B.c), said lateral piloting objective rc is advantageously determined from the following expression:

$$rc = reff + [k2 - reff + k3 \cdot (\psi c - \psi eff)]/k4$$

in which:
  k2, k3 and k4 are predetermined gains; reff is a measured current value of the rate of yaw of the airplane;
  ψc represents said guidance reference which corresponds to the geographic heading of the runway; and
  ψeff is a measured current value of the heading of the airplane.

In this first embodiment:
  in a first variant, said guidance reference ψc is determined from a predetermined magnetic heading of the runway and a calculated magnetic declination; and
  in a second variant, said guidance reference ψc is determined from geographic coordinates of the runway, obtained from an airport database.

Furthermore, in a second embodiment, in the step B.c), said lateral piloting objective rc is advantageously determined from the following expressions:

$$rc = reff - [Y3 + (V2 \cdot \Delta\psi + 2 \cdot V1 \cdot reff)]/Vground \cdot k5$$

$$Y3 = k6 \cdot [k7 \cdot (k8 \cdot [Yd-Y] - Vy) + (V1 \cdot \Delta\psi + V\text{ground} \cdot r)]$$

in which:
- k5, k6, k7 and k8 are predetermined gains;
- reff is a measured current value of the rate of yaw of the airplane;
- V2 is a measured derivative of the longitudinal acceleration of the airplane;
- V1 is a measured longitudinal acceleration of the airplane;
- Vground is a measured ground speed of the airplane;
- $\Delta\psi$ is a current heading clearance error;
- Yd is a lateral position to be followed in a runway checkpoint;
- Y is a lateral position of the airplane in the runway checkpoint; and
- Vy is a lateral speed of the airplane in the runway checkpoint.

In this second embodiment, in a first variant, said lateral position Y and said lateral speed Vy are determined using a processing unit comprising a means of detecting a lateral alignment beam, preferably of LOC type, which illustrates the axis of the runway.

Furthermore, in this second embodiment, in a second variant, said lateral position Y and said lateral speed Vy are determined from the following expressions:

$$Y = \rho AM \cdot \sin(\theta AM - QFU)$$

$$Vy = V\text{ground} \cdot \sin(\theta AM - QFU)$$

in which:
- $\rho AM$ is the distance of the airplane from a threshold of the runway, the distance being calculated from measured coordinates of the airplane and geographic coordinates of said threshold of the runway;
- $\theta AM$ is a geographic heading of the airplane, which is calculated from measured coordinates of the airplane;
- QFU is a calculated geographic heading of the runway;
- sin represents the sine; and
- Vground is a measured ground speed of the airplane.

Thus, with the abovementioned two embodiments, the automatic guidance mode used for the lateral plane can be selected, according to the invention, as a function of the guidance references that are available on the airport concerned.

In practice, as an example:
- if an LDC-type lateral alignment beam is available and measurable on the airplane, said first variant of said abovementioned second embodiment can be implemented;
- if no LOC beam is available, but if the airplane is equipped with an accurate (satellite) positioning device [(for example of GPS (Global Positioning System) type)] and an airport database, the second variant of said abovementioned second embodiment can be implemented;
- if no LOC beam is available, and if the airplane is not equipped with a positioning device, but it is equipped with an airport database, said second variant of said abovementioned first embodiment can be implemented; and
- if no LOC beam is available and the airplane is not equipped with any positioning device, nor with any airport database, said first variant of said abovementioned first embodiment can be implemented.

Moreover, in a particular embodiment, the alignment of the airplane is automatically monitored so as to ensure that it is on a runway authorized for the take-off.

Furthermore, advantageously, characteristic signs illustrating at least some of the following information are displayed automatically on at least one display screen:
- said lateral guidance objective;
- the piloting mode currently engaged on an automatic piloting means which handles the automatic elevation and lateral guidance of the airplane on the take-off; and
- a reference lateral path.

Moreover, in a particular embodiment, means are provided enabling a pilot to manually handle the elevation and/or lateral guidance of the airplane, instead of an automatic guidance. Thus, at any moment in the automatic take-off phase, the pilot can apply manual piloting, either by retaking control of a control device control column or rudder bar for example), or by deactivating the automatic piloting means that implement the automatic take-off according to the invention.

The present invention also relates to an automatic take-off device for an airplane.

According to the invention, said device is noteworthy in that it comprises a first automatic piloting assembly which comprises:
- first means for automatically determining an elevation guidance objective which represents an angular profile along the pitch axis of the airplane and which makes it possible to obtain performance levels that are optimized according to the take-off conditions, said angular profile being expressed according to a first parameter;
- second means for automatically measuring the current value of said first parameter on the airplane;
- third means for automatically determining, from said elevation guidance objective and said measured current value of said first parameter, a vertical piloting objective which is expressed as rate of pitch;
- fourth means for automatically determining, from said vertical piloting objective, deflection commands for elevators of the airplane; and
- operators of said elevators, to which are automatically applied the deflection commands determined by said fourth means.

In a particular embodiment, said third means are part of an automatic piloting means (or automatic pilot). Said first means can also be part of said automatic piloting means.

Furthermore, in a preferred embodiment, said device also comprises a second automatic piloting assembly which comprises:
- fifth means for automatically determining a lateral guidance objective which represents a particular guidance reference and which is expressed according to at least one second parameter;
- sixth means for automatically measuring the current value of said second parameter on the airplane;
- seventh means for automatically determining, from said lateral guidance objective and said measured current value of said second parameter, a lateral piloting objectives which is expressed as rate of yaw;
- eighth means for automatically determining, from said lateral piloting objective, actuation commands for controlling elements acting on the yaw of the airplane; and
- operators of said elements acting on the yaw of the airplane, to which are automatically applied the actuation commands determined by said eighth means.

In a particular embodiment, said seventh means are part of an automatic piloting means. Said fifth means can also be part of said automatic piloting means.

BRIEF DESCRIPTION OF THE DRAWINGS

The figures of the appended drawing will give a clear understanding of how the invention can be implemented. In these figures, identical references designate similar items.

DETAILED DESCRIPTION OF THE INVENTION

Figure 1:
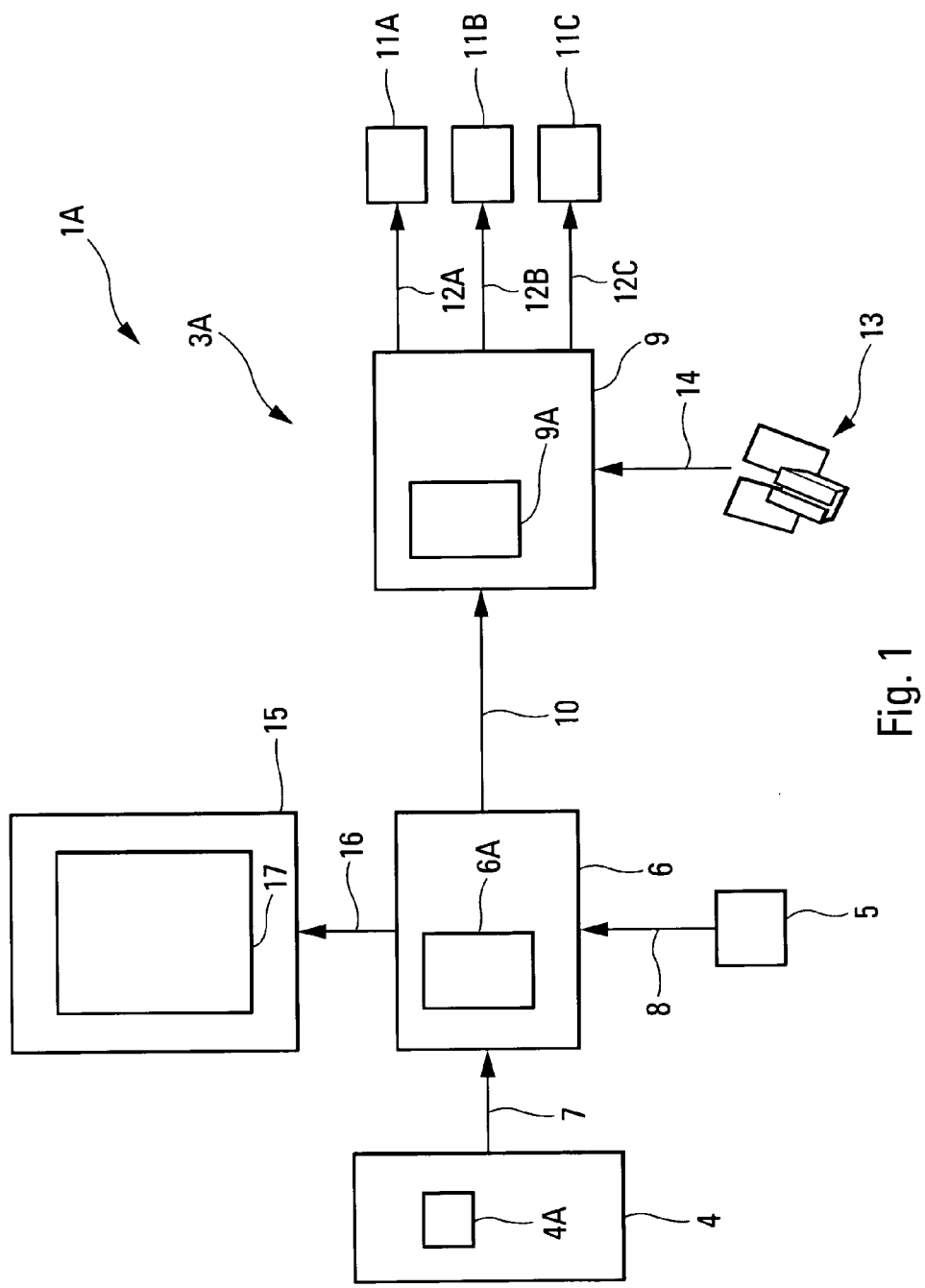
FIG. 1 is the block diagram of a first embodiment of a take-off aid device according to the invention, which can be used to implement a semi-automatic take-off.
Figure 2:
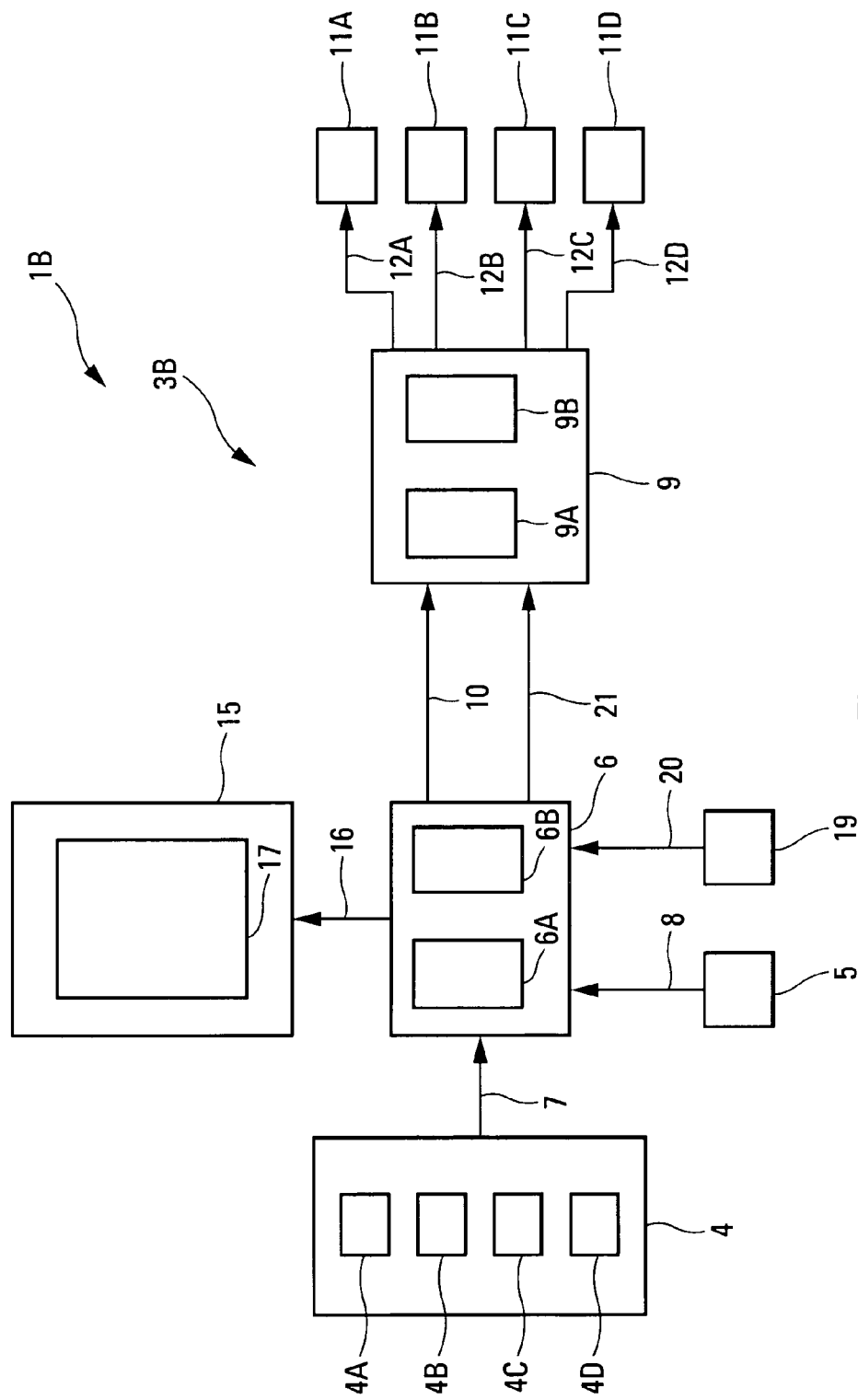
FIG. 2 is the block diagram of a second embodiment of a take-off aid device according to the invention, which can be used to implement semi-automatic take-off.

The device 1A, 1B according to the invention and diagrammatically represented according to two different embodiments respectively in FIGS. 1 and 2, is intended to automate, at least partly, the take-off phase of an airplane A, for example a transport airplane, on a take-off from a runway 2.

In the first embodiment represented in FIG. 1, which relates to a semi-automatic take-off, said device 1A which is onboard said airplane A comprises an automatic piloting assembly 3A which comprises:
- means 4 comprising means 4A, such as a flight management system of the FMS type for example, which are formed in such a way as to automatically determine an elevation guidance objective. According to the invention, this elevation guidance objective represents an angular profile along the pitch axis which makes it possible to obtain performance levels that are optimized according to particular take-off conditions (weight of the airplane A, engine failure, wind, etc.). This angular profile is expressed according to a first parameter. Preferably, this first parameter represents the trim θ of the airplane A. It can also be the angle of climb of the airplane A;
- standard means 5 for automatically measuring on the airplane A the current value of said first parameter;
- means 6, for example an automatic piloting means, which are linked via links 7 and 8 respectively to said means 4 and 5 and which comprise means 6A for automatically forming, from the elevation guidance objectives received from said means 4A and said current value received from said means 5, a vertical piloting objective which is expressed as rate of pitch, that is, as degree of trim per second or as degree of angle of climb per second;
- means 9, for example a flight control computer, which are linked via a link 10 to said means 6 and which comprise means 9A for automatically determining, from the vertical piloting objectives received is from the means 6A, standard elevator deflection commands (not shown) for the airplane A; and
- operators 11A of said elevators, to which are automatically applied the deflection commands determined by said means 9A (and transmitted via a link 12A).

The device 1A according to the invention thus makes it possible to ensure that a predefined vertical path objective is followed. This objective is defined to obtain the best performance of the airplane A regardless of the take-off conditions (weight of the airplane A, engine failure, wind, etc.), and this, as specified below, by also ensuring safety with respect to a tailstrike.

Said device 1A also makes it possible to ensure almost identical take-off performance levels, regardless of the physical, meteorological and human conditions, and to make these performance levels repetitive for a given airplane A.

It will be noted that the take-off performance levels can be enhanced (by the use of an optimal elevation guidance profile) in order to reduce the distance on take-off. The reduction in the distance on take-off can then be translated, for a given airplane A, into:
- the possibility of increasing the weight of fuel on board, which makes it possible to increase the action radius of the airplane A, and so, for example, reach airports that were hitherto inaccessible;
- the possibility of increasing the payload, which makes it possible to transport more passengers for commercial flights, or more cargo; and
- the possibility of taking off on airports with shorter runways.

In a preferred embodiment, said means 6A determiner said vertical piloting objective QcPA, from the following expression:

$$QcPA = k1 \cdot (\theta c - \theta eff)$$

in which:
- k1 is a predetermined gain;
- θc represents said angular profile (or elevation guidance objective) received from said means 4A. Preferably, as indicated above, this angular profile is expressed as a trim value (or, possibly, as an angle oaf climb value). This angular profile ac is determined empirically according to the weight, and possibly other parameters such as the time and/or the position at x relative to the rotation start point; and
- θeff represents the current value of the trim of the airplane A, which is measured by the means 5.

The device 1A according to the present invention therefore makes it possible to obtain an automatic guidance of the airplane A in the vertical plane, on the take-off. The guidance objective is therefore an angular profile along the pitch axis of the airplane (expressed as an angle of climb or, preferably, as trim), which is defined to guarantee the best performance levels given the airplane A concerned, the airport and the current external conditions (wind, etc.).

In a particular embodiment, said means 4A (or said means 6A) limit the value of said angular profile relative to the capabilities of the airplane A, in order to avoid a tailstrike on the take-off.

Furthermore, said means 9 also determine commands for controlling the horizontal stabilizer (not represented) of the airplane A, which is of adjustable type, and on which are mounted said elevators. For this, the commands determined by said means 9 are transmitted via a link 12B to standard operators 11B of said horizontal stabilizer. More specifically, said commands are formed so as to bring said adjustable horizontal stabilizer to a value that is constant according to the current aircraft balance of the airplane A.

In the embodiment of FIG. 1, the device 1A also comprises a standard rudder bar 13 which is linked via a link 14 to said means 9. This rudder bar 13 is intended to enable a pilot of the airplane A to manually guide the airplane A in the lateral plane, on the take-off. The various means associated with said rudder bar 13, which are used for this lateral guidance, are known and are not described further in this description.

This first embodiment of FIG. 1 is therefore intended for a semi-automatic take-off, since only the guidance of the airplane A in the vertical plane is performed automatically, the guidance in the lateral plane being performed manually using the rudder 13.

It will be noted that the means 9 make it possible:
- to accurately control the rate of pitch of the airplane A; and also
- to manage a risk of tailstrike on the take-off, thanks to an explicit voter protection on the internal pitch acceleration set point.

This active protection is formed in such a way as to limit the trim adjustment, by calculating in closed loop mode a maximum trim not to be exceeded, according to the ratio Vc/Vs1g (Vc) being the conventional speed of the airplane A and Vs1g being the stall speed under a unity load factor) and the radio-altimetric height. This active protection makes it possible to ensure that the difference between the tail of the airplane A and the ground does not exceed a predetermined value, without using for this a specific device for measuring this height.

Furthermore, in a particular embodiment, the device 1A also, comprises:
- standard means (not shown) for measuring the current speed of the airplane A;
- comparison means (not shown) which are incorporated, for example, in the means 6 or the means 9, and which are formed in such a way as to compare the duly measured current speed with a normal rotation speed, received, for example, from said means 4; and
- means, for example said means 6 and/or said means 9, which are formed in such a way as to implement the automatic take-off of the airplane A in the vertical plane, only when the measured current speed of the airplane A becomes greater than this predetermined rotation speed.

Moreover, in a preferred embodiment, said device 1A is formed in such a way as to control the bank angle of the airplane A in order to keep its wings flat. This is done in order to automatically keep the bank angle close to zero during the rotation of the airplane A, in order in particular to avoid a tailstrike and for performance reasons. This control is implemented by exclusively controlling ailerons of said airplane A, which are usually mounted on the wings of the latter. To this end, said means 9 transmit actuation commands, via a link 12C, to standard actuation means 11C of said ailerons.

Thus, simultaneously with the automatic management of the trim (or angle of climb) of the airplane A in the take-off phase, the device 1A automatically manages the bank angle so that this maneuver is carried out with the wings flat. This is done by controlling exclusively the deflection of the ailerons, without using spoilers for example (in particular so as not to degrade the performance levels on the take-off).

Moreover, said device 1A also comprises display means 15 which are, for example, linked via a link 16 to said means 6 and which are able to display on at least one display screen 17 information relating to said semi-automatic take-off. Preferably, said display means 15 are formed in such a way as to display on the display screen 17 at least one characteristic sign illustrating the elevation guidance objective. More specifically, said display means 15 are formed in such a way as to display:
- a horizontal bar indicating the elevation guidance objective, for example on a primary piloting screen; and
- an indication of the automatic piloting mode currently engaged, for example on a piloting mode indicator.

Moreover, in the second embodiment represented in FIG. 2, the device 1B is intended to perform a fully automatic take-off of the airplane A, that is, an automatic take-off in both the vertical plane and the lateral-plane.

To implement the automatic guidance of the airplane A in the vertical plane on the take-off, the device 1B comprises means similar to those used by the abovementioned device 1A to perform the same automatic elevation guidance. Thus, the means described with reference to FIG. 1 and included in FIG. 2 are not described further below.

On the other hand, in the lateral plane, the guidance is no longer performed manually by means of a rudder bar, but is implemented automatically by said device 1B.

For this, said device 1B notably comprises an automatic piloting assembly 3B which comprises in particular:
- means 4A, 4B, 4C, 4D specified below, which are incorporated in said means 4 and which are formed notably so as to automatically determine a lateral guidance objective. This lateral guidance objective which represents a particular guidance reference is expressed according to at least one second parameter, namely the track or the heading. This guidance reference relates to a parameter which is defined for the runway 2 used by the airplane A on the take-off;
- means 19 which are linked via a link 20 to said means 6 and which are formed to automatically measure the current value of said second parameter (track or heading) of the airplane A;
- means 6B which are incorporated in said means 6 and which are formed in such a way as to automatically determine, from said lateral guidance objective received from said means 4 and said current value measured by said means 19, a lateral piloting objective rc which is expressed as rate of yaw, that is, in degree of side-slip per second;
- means 9B which are incorporated in said means 9, which are linked via a link 21 to said means 6B and which are formed in such a way as to automatically determine, from said lateral piloting objective received from said means 6B, actuation commands for controlling elements that act on the yaw of the airplane A. In a preferred embodiment, these elements relate to a rudder and/or a nose wheel of the airplane A; and
- operators 11D of said elements (which act on the yaw of the airplane A), to which operators 11-D are automatically transmitted via a link 12D the actuation commands determined by said means 9B.

Thus, in this second embodiment, the take-off phase is performed fully automatically, that is, both in the vertical plane and in the lateral plane.

In a first embodiment, said device 1B guides the airplane A, laterally, relative to a reference heading. In this case, the heading guidance law, implemented by said means 6B, verifies the following expression:

$$rc = reff + [k2 - reff + k3 \cdot (\psi c - \psi eff)]/k4$$

in which:
- k2, k3 and k4 are predetermined gains;
- reff is a measured current value of the rate of yaw of the airplane A, which is measured by standard means, for example incorporated in said means 4;
- $\psi c$ represents said guidance reference (received from said means 4 or calculated by the means 6B from information received from said means 4) which corresponds to the geographic heading of the runway; and
- $\psi eff$ is the current heading value, measured by said means 19.

This heading guidance mode can be implemented in two variants, according to the source of the reference geographic headings.

In a first variant, said reference geographic heading ψgeo (which therefore represents the guidance reference ψc) is determined from a magnetic heading ψmag of the runway 2, which has been entered by the crew into the flight management system 4A when preparing the flight, and a magnetic declination Δψ which is permanently calculated according to measurements performed by at least one inertial unit included, for example, in said means 4). More specifically, said reference geographic heading ψgeo is obtained from the following expression:

$$\psi geo = \psi mag + \Delta\psi$$

In a second variant, the reference geographic heading (which represents the guidance reference ψc) is calculated from geographic coordinates of the runway 2, which are obtained from an airport database of the airplane A. Preferably, this airport database, is a database of a standard onboard airport navigation system 4B, of OANS (Onboard Airport Navigation System) type.

Figure 3:
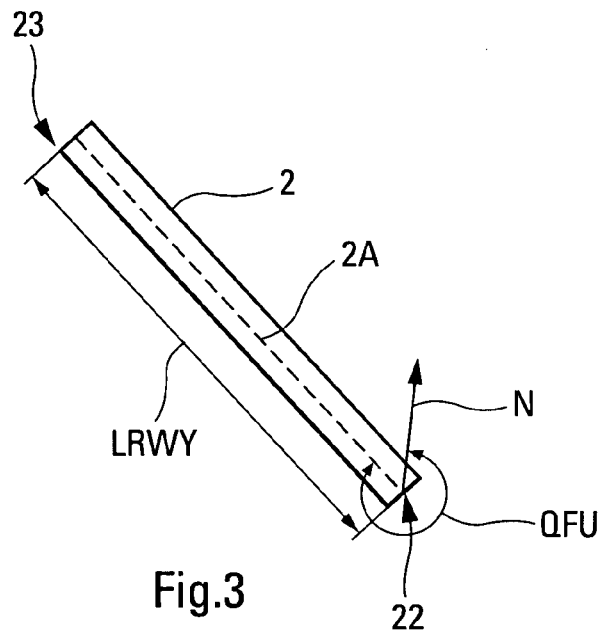
FIGS. 3 to 7 diagrammatically illustrate various situations taking into account the take-off runway, which clearly explain particular characteristics of the present invention.

In this case, the heading (or orientation) of the runway 2, called QFU, is calculated from the latitude and longitude coordinates, according to a usual standard WGS84 for example, of the threshold 22 (λTHR, μTHR) of the runway 2 and of the forward end 23 (λEND, μEND) of this runway 2 which has a length LRWY, as represented for example in FIG. 3. The heading QFU (relative to magnetic North N) of the runway 2 is calculated from the following relations:

$$-\text{if } \sin(\mu END - \mu THR) < 0$$
$$\text{then } QFU = \arccos\left(\frac{\sin(\lambda END) - \sin(\lambda THR) \cdot \cos(LRWY)}{\sin(LRWY) \cdot \cos(\lambda THR)}\right) -$$
$$\text{else, } QFU = 2\pi - \arccos\left(\frac{\sin(\lambda END) - \sin(\lambda THR) \cdot \cos(LRWY)}{\sin(LRWY) \cdot \cos(\lambda THR)}\right)$$

where LRWY is the length of the runway 2, in meters, which is calculated using the following expression:

$$LRWY = REARTH \cdot 2 \cdot \arcsin$$
$$\sqrt{\sin^2\left(\frac{\lambda THR - \lambda END}{2}\right) + \cos(\lambda THR) \cdot \cos(\lambda END) \cdot \sin^2\left(\frac{\mu THR - \mu END}{2}\right)}$$

where REARTH is the radius of the earth, which is expressed in meters.

Furthermore, in a second embodiment, said device 1B guides the airplane A, laterally, relative to the axis 2A of the runway 2. In this case, the guidance law on the axis 2A of the runway 2, implemented by said means 6B, verifies the following expressions:

$$rc = reff - [Y3 + (V2 \cdot \Delta\psi + 2 \cdot V1 \cdot reff)/Vground \cdot k5$$

$$Y3 = k6 \cdot [k7 \cdot (k8 \cdot Yd - Y] - Vy) + (V1 \cdot Ay + Vground \cdot r)]$$

in which:
k5, k6, k7 and k8 are predetermined gains;
reff is a measured current value of the rate of yaw of the airplane A;
V2 is a measured derivative of the longitudinal acceleration of the airplane A;
V1 is a measured longitudinal acceleration of the airplane A;

Vground is a ground speed, measured in the usual way, of the airplane A;
Δψ is a current heading clearance error, such as Δψ=QFU−current heading;
Y3 is the time derivative of the lateral acceleration of the airplane A relative to the axis 2A of the runway 2;
Yd is a lateral position to be followed in a runway check-point (Xp, Yp), Yd is equal to 0 if the airplane A must follow the axis 2A of the runway 2;
Y is a lateral position of the airplane A in the runway check-point (Xp, Yp); and
Vy is a lateral speed of the airplane A in the runway check-point (Xp, Yp).

The values reff, V2 and V1 are measured in the usual way by at least one inertial unit of the airplane A, included, for example, in said means 4.

This second embodiment can be implemented in two variants, according to the method of calculating the lateral position Y and the lateral speed Vy of the airplane A relative to the axis 2A of the runway 2.

Figure 4:
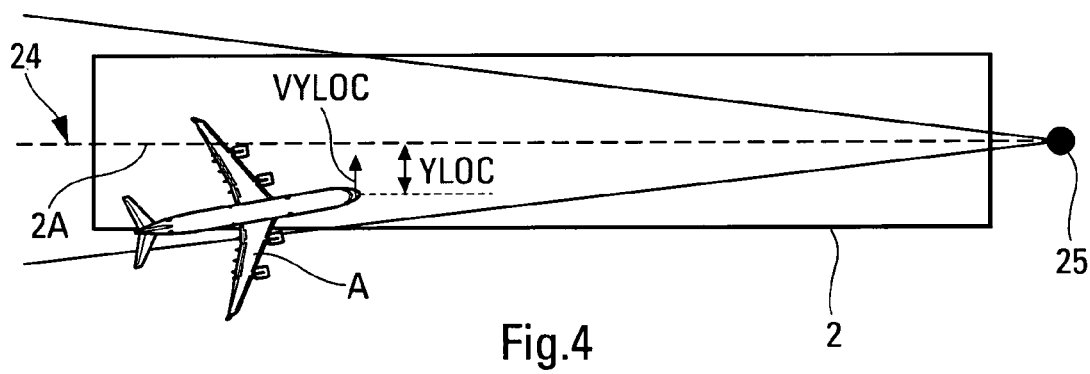

In a first variant of, embodiment, the calculations are based on a standard lateral alignment beam 24, of LOC type, which is emitted by a standard radiotransmitter 25, as represented in FIG. 4.

Such a lateral alignment beam 24 (or LOC beam) is normally emitted by a radiotransmitter 25 of directional VHF type, which is placed an the axis 2A of the runway 2 at the end opposite to the threshold. This LOC beam in principle handles the azimuth guidance along the approach axis, and this according to an ideal lateral alignment profile in a precision instrument approach of the ILS (Instrument Landing System) type. To this end, this radiotransmitter 25 normally emits two signals with different modulations, which overlap in the approach axis where the two signals are received with equal intensity.

This beam 24 which is therefore generally used to guide the airplane A laterally in an automatic landing, is used according to the invention for the take-off. To do this, a standard processing unit 4C which comprises, in particular, a standard LOC antenna which is mounted in the nose of the airplane A, is used to calculate, in the usual way, the lateral deviation YLOC of the airplane A relative to said beam 24, and the speed VYLOC of movement of the airplane A relative to this beam 24, as represented in FIG. 4. In this first variant, the device 1B therefore uses the duly calculated YLOC and VYLOC values, for the abovementioned parameters Y and Vy.

Figure 5:
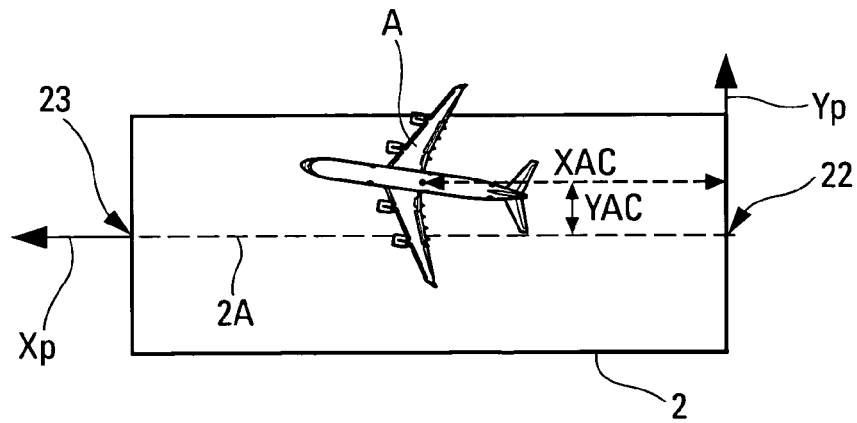

Furthermore, in a second variant, said lateral position Y and said lateral speed Vy are determined by said means 9B, from the following expressions:

$$Y = YAC \cdot \rho AM \cdot \sin(\theta AM - QFU)$$

$$Vy = Vground \cdot \sin(\theta AM - QFU)$$

in which:
ρAM (namely XAC in FIG. 5) is the distance of the airplane A from the threshold 22 of the runway 2, the distance being calculated from measured coordinates of the airplane A and geographic coordinates of said threshold 22 of the runway 2, as specified below;
θAM is a geographic heading of the airplane A, which is calculated from measured coordinates of the airplane A, as specified below;
QFU is a geographic heading of the runway 2, calculated in the usual way as indicated above;
sin represents the sine; and Vground is a ground speed, measured in the usual way, of the airplane A.

The distance ρAM of the airplane A from the runway threshold 22 is calculated from the GPS coordinates {λAC, μAC} of the airplane A and the geographic coordinates {λTHR, μTHR} of the runway threshold 22:

$$\rho AM = REARTH \cdot 2 \cdot \arcsin \sqrt{\sin^2\left(\frac{\lambda THR - \lambda AC}{2}\right) + \cos(\lambda THR) \cdot \cos(\lambda AC) \cdot \sin^2\left(\frac{\mu THR - \mu AC}{2}\right)}$$

The geographic heading θAM of the airplane A is also calculated from the GPS coordinates of the airplane A:

$$-\text{if } \sin(\mu AC - \mu THR) < 0$$
$$\text{then } \theta AM = \arccos\left(\frac{\sin(\lambda AC) - \sin(\lambda THR) \cdot \cos(\rho AM)}{\sin(\rho AM) \cdot \cos(\lambda THR)}\right) -$$
$$\text{else, } \theta AM = 2\pi - \arccos\left(\frac{\sin(\lambda AC) - \sin(\lambda THR) \cdot \cos(\rho AM)}{\sin(\rho AM) \cdot \cos(\lambda THR)}\right)$$

Said GPS coordinates are measured by a standard, onboard measurement device (or positioning device) 4D, which is associated with a satellite positioning system.

Thus, thanks to the abovementioned two embodiments of the device 1B, the type of automatic guidance mode used for the lateral plane can be selected, according to the invention, according to guidance references which are available on the airport concerned.

Thus, for example:
  if a lateral alignment beam 24 of LOC type is available and measurable on the airplane A, the device 1B can implement said first variant of said abovementioned second embodiment;
  if no LOC beam is available, but if the airplane A is equipped with an accurate positioning device [for example of GPS (Global Positioning System) type] and an airport database, the device 1B can implement the second variant of said abovementioned second embodiment;
  if no LOC beam is available, and if the airplane A is not equipped with an accurate positioning device, but is equipped with an airport database, the device 1B can implement said second variant of said abovementioned first embodiment; and
  if no LOC beam is available and the airplane A is not equipped with any positioning device, nor with any airport database, the device 1B can implement said first variant of said abovementioned first embodiment.

Moreover, in a particular embodiment, the automatic lateral guidance mode of the airplane A on the take-off is protected by a monitoring of the alignment of the airplane A, implemented by said device 1B, in order to check that the airplane A is on the authorized runway 2, and not on an unauthorized runway 27 or 28. The alignment check is based on the monitoring of two parameters specified below.

Figure 6:
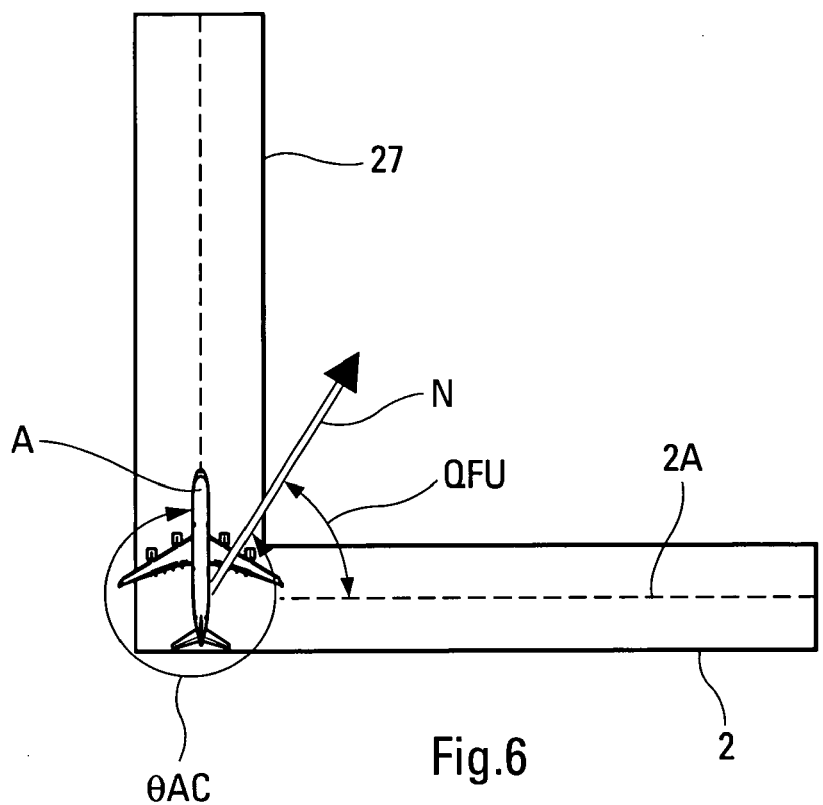
Figure 7:
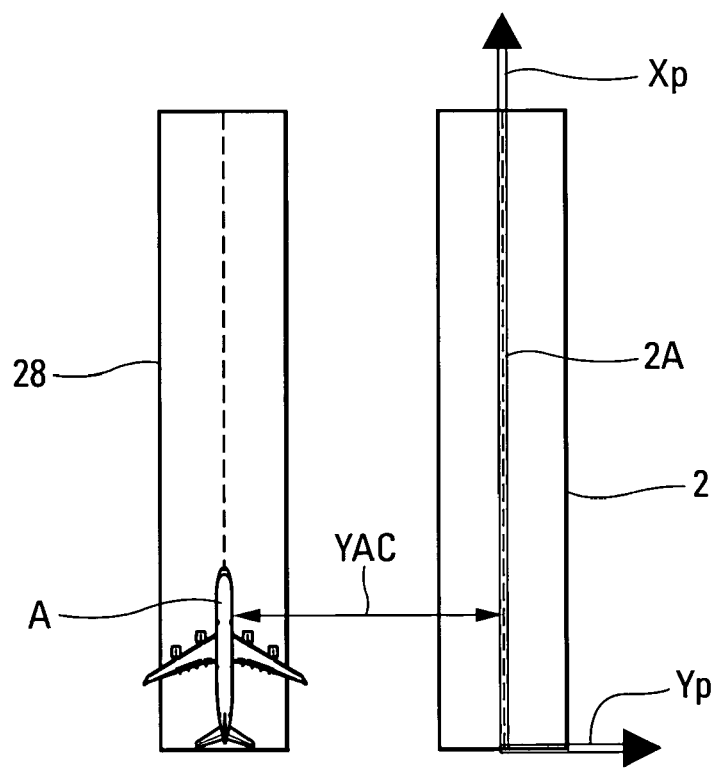

Firstly, as represented in FIG. 6, the device 1B checks the deviation between the heading θAC of the airplane A and the reference heading QFU (of the authorized runway 2) in the case of crossed runways 2 and 27. In practice, in the case of crossed runways 7 and 27, the airplane A can have the same lateral position, although it is aligned on a runway that is not authorized for the take-off. By thus monitoring the heading of the airplane A, it is possible to check that the latter is correctly aligned on the authorized runway 2 and not on the unauthorized runway 27. In the example of FIG. 6, the airplane A is on the unauthorized runway 27.

Furthermore, it is appropriate to check the lateral position deviation YAC between the position of the airplane A and the axis 2A of the authorized runway 2 in the case of parallel runways 2 and 28. In practice, in the case of parallel runways 2 and 28, the heading of the airplane A can be identical to the heading QFU of the authorized runway 2, but its lateral position may not conform to the correct alignment. To make this check, the geographic coordinates of the authorized runway 2 are used. The GPS position of the airplane A then makes it possible to position the airplane in a check-point (Xp, Yp) linked to the runway 2.

The device 1B also comprises display means 15 which can automatically display, on at least one display screen 17, characteristic signs illustrating at least some of the following information:
  said lateral guidance objective (for example on a primary piloting screen);
  the piloting mode engaged on the automatic piloting means which handles the automatic elevation and lateral guidance of the airplane on the take-off (for example, on a piloting mode indicator); and
  a reference lateral path (for example on an interface of an airport navigation system).

Moreover, in a particular embodiment, said device 1A, 1B also comprises means (not shown) enabling a pilot to revert manually to an elevation and/or lateral guidance of the airplane, instead of a current automatic guidance. Thus, at any moment in the automatic take-off phase, the pilot can apply manual piloting, either by retaking control of a control device (control column on rudder bar 13 for example), or by deactivating the automatic piloting means which implement the automatic take-off according to the invention.

The invention claimed is:

1. An automatic take-off method for an airplane, whereby, for an elevation guidance of the airplane on a take-off, the following successive series A of steps is performed, automatically and repetitively, on said take-off, comprising:
  A, a) determining an elevation guidance objective, using a flight management system, which represents an angular profile along the pitch axis of the airplane, said angular profile being expressed according to a first parameter;
  A. b) measuring, using a standard trim device, the current value of said first parameter on the airplane;
  A. c) from said elevation guidance objective and said measured current value of said first parameter, determining, using an automatic piloting device, a vertical piloting objective which is expressed as rate of pitch;
  A. d) from said vertical piloting objective, determining, using a flight control computer, elevator deflection commands for the airplane; and
  A. e) the determined elevator deflection commands are applied to operators of said elevators, wherein, in the step A. c), determining said vertical piloting objective QcPA from the following expression:

$QcPA = k1 \cdot (\theta c - \theta eff)$ in which:
  k1 is a predetermined gain;
  θc represents said angular profile which can be used to obtain optimized performance levels according to take-off conditions; and
  θeff represents a measured current value of said first parameter, wherein for a lateral guidance of the airplane on the take-off, the following successive series of steps B is performed, automatically and repetitively, on said take-off, comprising:

B. a) determining a lateral guidance objective which represents a particular guidance reference and which is expressed according to at least one second parameter;

B. b) measuring the current value of said second parameter on the airplane;

B. c) from said lateral guidance objective and said measured current value of said second parameter, determining a lateral piloting objective which is expressed as rate of yaw;

B. d) from said lateral piloting objective, determining actuation commands to control elements acting on the yaw of the airplane; and B. e) applying said determined elevator actuation commands to operators of said elements, wherein said guidance reference concerns a second parameter which is defined for the runway used by the airplane for the take-off, wherein said second parameter is the heading of the runway, and wherein, in the step B. c), said lateral piloting objective re is determined from the following expression:

$$rc = reff + [k2 - reff + k3 \cdot (\psi c - \psi eff)]/k4$$

in which:
k2, k3 and k4 are predetermined gains,
reff is a measured current value of the rate of yaw of the airplane,
$\psi c$ represents said guidance reference which corresponds to the geographic heading of the runway, and
$\psi eff$ is a measured current value of the heading of the airplane.

2. The method as claimed in claim 1, wherein said angular profile is expressed as an angle of climb value.

3. The method as claimed in claim 1, wherein said angular profile is expressed as a trim value.

4. The method as claimed in claim 1, wherein the value of said angular profile is limited relative to the capabilities of the airplane to avoid a tailstrike on the take-off.

5. The method as claimed in claim 1, wherein, on the take-off, at least one adjustable horizontal stabilizer of the airplane, on which are articulated said elevators, is brought to a fixed position which depends on the aircraft balance of the airplane.

6. The method as claimed in claim 1, wherein the current speed of the airplane is measured, it is compared to a predetermined rotation speed, and at least the step A. e) is applied, when said current speed becomes greater than said rotation speed.

7. The method as claimed in claim 1, wherein, when the airplane is moving on the take-off, the bank angle of the airplane is controlled automatically, by exclusively controlling ailerons of said airplane so as to keep the wings flat.

8. The method as claimed in claim 1, wherein a characteristic sign illustrating said elevation guidance objective is displayed automatically on at least one display screen.

9. The method as claimed in claim 1, wherein, for lateral guidance on the take-off, the airplane is guided manually by a pilot of the airplane using a rudder bar.

10. The method as claimed in claim 1, wherein said second parameter is the track.

11. The method as claimed in claim 1, wherein said guidance reference $\psi c$ is determined from a predetermined magnetic heading of the runway and a calculated magnetic declination.

12. The method as claimed in claim 1, wherein said guidance reference $\psi c$ is determined from geographic coordinates of the runway, obtained from an airport database.

13. An automatic take-off method for an airplane, whereby, for an elevation guidance of the airplane on a take-off, the following successive series A of steps is performed automatically and repetitively, on said take-off, comprising:

A. a) determining an elevation guidance objective, using a flight management system, which represents an angular profile along the pitch axis of the airplane, said angular profile being expressed according to a first parameter;

A. b) measuring, using a standard trim device, the current value of said first parameter on the airplane;

A. c) from said elevation guidance objective and said measured current value of said first parameter, determining, using an automatic piloting device, a vertical piloting objective which is expressed as rate of pitch;

A. d) from said vertical piloting objective, determining, using a flight control computer, elevator deflection commands for the airplane; and A. e) the determined elevator deflection commands are applied to operators of said elevators, wherein, in the step A. c), determining said vertical piloting objective QcPA from the following expression:

$$QcPa = k1 \cdot (\theta c - \theta eff)$$

in which:
k1 is a predetermined gain;
$\theta c$ represents said angular profile which can be used to obtain optimized performance levels according to take-off conditions; and
$\theta eff$ represents a measured current value of said first parameter, wherein for a lateral guidance of the airplane on the take-off, the following successive series of steps B is performed, automatically and repetitively, on said take-off, comprising:

B. a) determining a lateral guidance objective which represents a particular guidance reference and which is expressed according to at least one second parameter;

B. b) measuring the current value of said second parameter on the airplane;

B. c) from said lateral guidance objective and said measured current value of said second parameter, determining a lateral piloting objective which is expressed as rate of yaw;

B. d) from said lateral piloting objective, determining actuation commands to control elements acting on the yaw of the airplane; and B. e) applying said determined elevator actuation commands to operators of said elements, wherein, in the step B. c), said lateral piloting objective rc is determined from the following expressions;

$$rc = reff - [Y3 + (V2 \cdot \Delta\psi + 2 \cdot V1 \cdot reff)]/V\text{ground} \cdot k5$$

$$Y3 = k6 \cdot [k7 \cdot (k8 \cdot [Yd - Y] - Vy) + (V1 \cdot \Delta\psi + V\text{ground} \cdot r)]$$

in which:
k5, k6, k7 and k8 are predetermined gains;
reff is a measured current value of the rate of yaw of the airplane;
V2 is a measured derivative of the longitudinal acceleration of the airplane;

V1 is a measured longitudinal acceleration of the airplane;
Vground is a measured ground speed of the airplane;
Δψ is a current heading clearance error;
Yd is a lateral position to be followed in a runway checkpoint;
Y is a lateral position of the airplane in the runway checkpoint; and
Vy is a lateral speed of the airplane in the runway cheekpoint.

14. The method as claimed in claim 13, wherein said lateral position Y and said lateral speed Vy are determined using a processing unit comprising a means of detecting a lateral alignment beam illustrating the axis of the runway.

15. The method as claimed in claim 13, wherein said lateral position Y and said lateral speed Vy are determined from the following expressions:

$$Y = \rho AM \cdot \sin(\theta AM - QFU)$$

$$Vy = V\text{ground} \cdot \sin(\theta AM - QFU)$$

in which:
ρAM is the distance of the airplane from a threshold of the runway, the distance being calculated from measured coordinates of the airplane and geographic coordinates of said threshold of the runway;
θAM is a geographic heading of the airplane, which is calculated from measured coordinates of the airplane;
QFU is a calculated geographic heading of the runway;
sin represents the sine; and
Vground is a measured ground speed of the airplane.

16. An automatic take-off method for an airplane, whereby, for an elevation guidance of the airplane on a take-off, the following successive series A of steps is performed, automatically and repetitively, on said take-off, comprising:
   A. a) determining an elevation guidance objective, using a flight management system, which represents an angular profile along the pitch axis of the airplane, said angular profile being expressed according to a first parameter;
   A. b) measuring, using a standard trim device, the current value of said first parameter on the airplane;
   A. c) from said elevation guidance objective and said measured current value of said first parameter, determining, using an automatic piloting device, a vertical piloting objective which is expressed as rate of pitch;
   A. d) from said vertical piloting objective, determining, using a flight control computer, elevator deflection commands for the airplane; and
   A. e) the determined elevator deflection commands are applied to operators of said following expression:

$$QcPA = k1 \cdot (\theta c - \theta \mathit{eff})$$

in which:
k1 is a predetermined gain;
θc represents said angular profile which can be used to obtain optimized performance levels according to take-off conditions; and
θeff represents a measured current value of said first parameter,
wherein, for a lateral guidance of the airplane on the take-off, the following successive series of steps B is performed automatically and repetitively on said take-off, comprising:
   B. a) determining a lateral guidance objective which represents a particular guidance reference and which is expressed according to at least one second parameter;
   B. b) measuring the current value of said second parameter on the airplane;
   B. c) from said lateral guidance objective and said measured current value of said second parameter, determining a lateral piloting objective which is expressed as rate of yaw;
   B. d) from said lateral piloting objective, determining actuation commands to control elements acting on the yaw of the airplane; and
   B. e) applying said determined elevator actuation commands to operators of said elements, and
   wherein the alignment of the airplane is automatically monitored so as to ensure that it is on a runway authorized for the take-off.

17. The method as claimed in claim 16, wherein characteristic signs illustrating at least some of the following information are displayed automatically on at least one display screen:
   said lateral guidance objective;
   the piloting mode currently engaged on an automatic piloting device which handles the automatic elevation and lateral guidance of the airplane on the take-off; and
   a reference lateral path.

18. The method as claimed in claim 16, wherein said actuation commands are applied to actuation device of a rudder and a nose wheel of the airplane.

19. The method as claimed in claim 16, further comprising enabling a pilot to manually guide the airplane, instead of an automatic guidance.

20. An automatic take-off device for an airplane, said device including a first automatic piloting assembly, comprising:
   a first device configured for automatically determining an elevation guidance objective which represents an angular profile along the pitch axis of the airplane, said angular profile being expressed according to a first parameter;
   a second device configured for to automatically measuring the current value of said first parameter on the airplane;
   a third device configured for automatically determining, from said elevation guidance objective and said measured current value of said first parameter, a vertical piloting objective which is expressed as rate of pitch;
   a fourth device configured for automatically determining, from said vertical piloting objective, deflection commands for elevators of the airplane; and
   operators of said elevators, to which are automatically applied the deflection commands determined by said fourth device, wherein said third device includes a unit determining said vertical piloting objective QcPA, from the following expression:

$$QcPA = k1 \cdot (\theta c - \theta \mathit{eff})$$

in which:
k1 is a predetermined gain;
θc represents said angular profile which can be used to obtain optimized performance levels according to take-off conditions;
θeff represents the measured current value of said first parameter,
a second automatic piloting assembly which comprises:
   a fifth device automatically determining a lateral guidance objective which represents a particular guidance reference and which is expressed according to at least one second parameter;
   a sixth device automatically measuring the current value of said second parameter on the airplane;
   a seventh device automatically determining, from said lateral guidance objective and said measured current value of said second parameter, a lateral piloting objective which is expressed as rate of yaw;

an eighth device automatically determining, from said lateral piloting objective, actuation commands for controlling elements acting on the yaw of the airplane; and operators of said elements acting on the yaw of the airplane, to which are automatically applied the actuation commands determined by said eighth device, wherein said guidance reference concerns a second parameter which is defined for the runway used by the airplane for the take-off, wherein said second parameter is the heading of the runway, and wherein said seventh device determines said lateral piloting objective rc from the following expression:

$$rc = reff + [k2 - reff + k3 \cdot (\psi c - \psi eff)]/k4$$

in which:

k2, k3 and k4 are predetermined gains, reff is a measured current value of the rate of yaw of the airplane, ψc represents said guidance reference which corresponds to the geographic heading of the runway, and ψeff is a measured current value of the heading of the airplane.

21. The device as claimed in claim 20, wherein said third device is part of an automatic piloting device.

22. The device as claimed in claim 21, wherein said first device is part of said automatic piloting device.

23. The device as claimed in claim 20, wherein said seventh device is part of an automatic piloting device.

24. The device as claimed in claim 23, wherein said fifth device is part of said automatic piloting device.

25. An airplane, comprising a device specified in claim 20.

26. An automatic take-off method for an airplane, whereby, for an elevation guidance of the airplane on a take-off, the following successive series A of steps is performed, automatically and repetitively, on said take-off, comprising:

A. a) determining an elevation guidance objective, using a flight management system, which represents an angular profile along the pitch axis of the airplane, said angular profile being expressed according to a first parameter;

A. b) measuring, using a standard trim device, the current value of said first parameter on the airplane;

A. c) from said elevation guidance objective and said measured current value of said first parameter, determining a vertical piloting objective, using an automatic piloting device, which is expressed as rate of pitch;

A. d) from said vertical piloting objective, determining, using a flight control computer, elevator deflection commands for the airplane; and A. e) the duly determined deflection commands are applied to operators of said elevators, wherein, in the step A. c), determining said vertical piloting objective QcPA from the following expression:

$$QcPA = k1 \cdot (\theta c - \theta eff)$$

in which:

k1 is a predetermined gain;

θc represents said angular profile which can be used to obtain optimized performance levels according to take-off conditions; and θeff represents a measured current value of said first parameter, wherein, for a lateral guidance of the airplane on the take-off, the following successive series of steps B is performed, automatically and repetitively, on said take-off, comprising:

B. a) determining a lateral guidance objective which represents a particular guidance reference and which is expressed according to at least one second parameter;

B. b) measuring the current value of said second parameter on the airplane;

B. c) from said lateral guidance objective and said measured current value of said second parameter, determining a lateral piloting objective which is expressed as rate of yaw;

B. d) from said lateral piloting objective, determining actuation commands to control elements acting on the yaw of the airplane; and B. e) applying said duly determined actuation commands to operators of said elements, wherein said guidance reference concerns a second parameter which is defined for the runway used by the airplane for the take-off wherein said second parameter is the heading of the runway, wherein, in the step B. c), said lateral piloting objective rc is determined from the following expression:

$$rc = reff + [k2 - reff + k3 \cdot (\psi c - \psi eff)]/k4$$

in which:

k2, k3 and k4 are predetermined gains;

reff is a measured current value of the rate of yaw of the airplane;

ψc represents said guidance reference which corresponds to the geographic heading of the runway; and ψeff is a measured current value of the heading of the airplane.

* * * * *